(12) United States Patent
Russell et al.

(10) Patent No.: US 11,216,240 B2
(45) Date of Patent: Jan. 4, 2022

(54) MEMS MICROPHONE

(71) Applicant: Infineon Technologies AG, Neubiberg (DE)

(72) Inventors: David Andrew Russell, Bernareggio (GB); Florian Brame, Villach (AT); Dietmar Straeussnigg, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 9 days.

(21) Appl. No.: 16/580,316

(22) Filed: Sep. 24, 2019

(65) Prior Publication Data

US 2020/0110570 A1    Apr. 9, 2020

(30) Foreign Application Priority Data

Oct. 9, 2018 (EP) ..................... 18199425

(51) Int. Cl.
| | |
|---|---|
| *G06F 17/00* | (2019.01) |
| *G06F 3/16* | (2006.01) |
| *G10L 15/28* | (2013.01) |
| *H04R 17/02* | (2006.01) |
| *H04R 19/04* | (2006.01) |

(52) U.S. Cl.
CPC ............ *G06F 3/162* (2013.01); *G10L 15/285* (2013.01); *H04R 17/02* (2013.01); *H04R 19/04* (2013.01); *H04R 2201/003* (2013.01)

(58) Field of Classification Search
CPC ....... G06F 3/162; G10L 15/285; H04R 17/02; H04R 19/04; H04R 2201/003

USPC .......................................... 700/94
See application file for complete search history.

(56) References Cited

U.S. PATENT DOCUMENTS

| | | | | |
|---|---|---|---|---|
| 6,043,694 | A  * | 3/2000 | Dortu .................. | G11C 7/1066 327/156 |
| 9,478,234 | B1* | 10/2016 | Nandy ................... | G10L 25/78 |
| 2012/0076339 | A1* | 3/2012 | Buck ..................... | H04R 3/007 381/369 |
| 2013/0195288 | A1 | 8/2013 | Ye | |
| 2015/0125004 | A1 | 5/2015 | Cagdaser et al. | |
| 2015/0256914 | A1 | 9/2015 | Wiesbauer et al. | |
| 2015/0256916 | A1 | 9/2015 | Volk et al. | |
| 2017/0308352 | A1* | 10/2017 | Kessler .................. | G06F 3/165 |
| 2019/0080680 | A1* | 3/2019 | Thomsen ............... | H04R 3/005 |

FOREIGN PATENT DOCUMENTS

DE        102015103419 A1    9/2015

* cited by examiner

*Primary Examiner* — Paul C McCord

(74) *Attorney, Agent, or Firm* — Slater Matsil, LLP

(57) ABSTRACT

Embodiments provide a MEMS microphone, comprising an output interface for providing an output signal of the MEMS microphone, and comprising a memory, wherein the output interface is configured to provide, in a normal mode of operation, a microphone signal as the output signal of the MEMS microphone, and wherein the output interface is configured to provide, in an initialization mode of operation, a data signal as the output signal of the MEMS microphone, wherein the data signal carries an information stored in the memory.

18 Claims, 5 Drawing Sheets

MEMS MICROPHONE

This application claims the benefit of European Application No. 18199425, filed on Oct. 9, 2018, which application is hereby incorporated herein by reference in its entirety.

TECHNICAL FIELD

Embodiments relate to a MEMS microphone.

BACKGROUND

A manufacturer of user equipment (e.g., smartphone, tablets, etc.) generally places microphones from different vendors into the same assembly position (second source option). In this case, a signal processor (e.g., implemented in software) is required to know which assembly version it is running on because different microphones will have different behaviors (e.g., transfer functions, filters, etc.).

SUMMARY

Embodiments provide a MEMS microphone, comprising an output interface for providing an output signal of the MEMS microphone, and comprising a memory, wherein the output interface is configured to provide, in a normal mode of operation, a microphone signal as the output signal of the MEMS microphone, and wherein the output interface is configured to provide, in an initialization mode of operation, a data signal as the output signal of the MEMS microphone, wherein the data signal carries an information stored in the memory.

Further embodiments relate to a method for reading out data from a memory of a MEMS microphone. Further embodiments relate to a method for transmitting data from a MEMS microphone to a signal processor. Some embodiments relate to a data read out method for microphone over a single line.

BRIEF DESCRIPTION OF THE DRAWINGS

Embodiments are described herein referring to the appended drawings.

DETAILED DESCRIPTION OF ILLUSTRATIVE EMBODIMENTS

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

There is a need to enable a communication between a microphone and digital signal processor (DSP) or coded over a single line. For instance, there is a simplification in logistics on system level possible, if data like chip ID or calibration parameters (stored in the microphone) can be transmitted to the DSP or codec.

For example, there is a logistics problem for a phone manufacturer. If the manufacturer is putting microphones from different vendors into the same assembly position (second source option) then the software must know which assembly version it is running on because different microphones will have different behaviors (e.g., transfer function, filters, etc.).

Without the possibility to read out at least an ID then the assembly version must be provided by other means (e.g., OTP, flash, etc.) which tend to increase complexity and cost.

If, for example, the processor, DSP or codec has the ability to read the microphone ID, then the software can react to different assembly versions without (by loading software drivers) the need of further information.

During startup (normally several milliseconds) of the digital microphone, the acoustic signal is disconnected from the line. According to embodiments, this time frame is used for transmitting data from the microphone, for example, to a signal processor, such as a digital signal processor (DSP) or codec.

Figure 1:
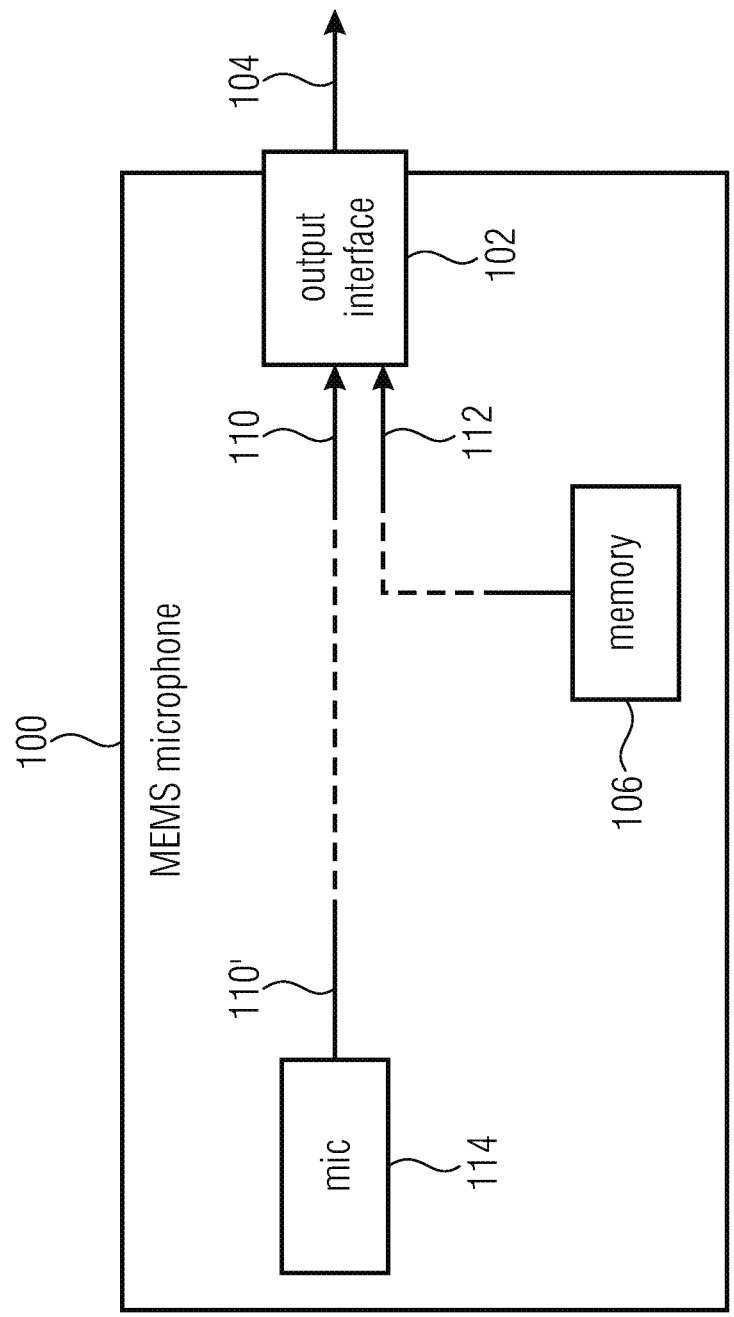
FIG. 1 shows a schematic block diagram of a MEMS microphone, according to an embodiment.

FIG. 1 shows a schematic block diagram of a MEMS microphone 100 (MEMS=microelectromechanical system), according to an embodiment. The MEMS microphone 100 comprises an output interface 102 for providing an output signal 104 of the MEMS microphone 100 and a memory 106. The output interface 102 is configured to provide (or forward), in a normal mode of operation, a microphone signal 110 as the output signal 104 of the MEMS microphone 100, and to provide (or forward), in an initialization mode of operation, a data signal 112 as the output signal 104 of the MEMS microphone 100, wherein the data signal 112 carries an information stored in the memory 106.

In embodiments, the output interface 102 can be a single line output interface, i.e., the same single line is used for transmitting the microphone signal 110 in the normal mode of operation and the data signal 112 in the initialization mode of operation.

For example, a single line may have two wires, a signal wire and ground wire or two symmetric wires.

In embodiments, the output interface 102 can be configured to provide, in the respective mode of operation, the microphone signal 110 and the data signal 112 at the same output pins (or terminals) of the output interface 102.

For example, the microphone signal 110 and the data signal 112 can be provided in the respective mode of operation using the same two output pins of the output interface 102. The two output pins can be a signal pin and a ground pin, or two symmetric signal pins.

In embodiments, the initialization mode of operation can be a power on reset mode.

In embodiments, the initialization mode of operation can be a clock change mode.

In embodiments, the memory 106 can be a non-volatile memory or a hard-coded memory.

In embodiments, the information stored in the memory can comprise an ID (identifier) of the MEMS microphone 100.

In embodiments, the information stored in the memory can comprise at least one parameter dependent on an acoustic characteristic of the MEMS microphone 100, such as a calibration parameter or filter coefficient, which can be used, for example, for improving the acoustic performance of the MEMS microphone 100.

In embodiments, the data signal 112 can be a binary signal, e.g., a signal binary modulated in dependence on the information stored in the memory 106, such that the data signal 112 carries the information stored in the memory 106.

For example, normally, a MEMS microphone may be configured to provide during the initialization mode of operation a PDM zero signal (without offset), such as a clock divided by two signal. In embodiments, during at least a part of this initialization mode of operation (i.e., during a (small) time interval of the initialization mode), the output interface 102 can be configured to provide the (binary) data signal 112 instead of the PDM zero signal (without offset). A signal processor (e.g., digital signal processor or codec) connected to the MEMS microphone 100 can receive, during the initialization mode of operation, this data signal 112 and set or adjust at least one signal processing parameter (e.g., a calibration parameter or a filter coefficient of a filter used for processing the microphone signal 110) in response to the information carried by the data signal 112. In contrast to that, a signal processor connected to the MEMS microphone 100 not being capable to receive the data signal 112 most likely would not notice the difference between the data signal 112 and the PDM zero signal (without offset).

As shown in FIG. 1, the MEMS microphone 100 comprises a MEMS microphone unit 114, wherein the microphone signal 110 of the MEMS microphone 100 depends on a signal 110' provided by the MEMS microphone unit 114.

For example, the microphone signal 110 of the MEMS microphone 100 can be a processed version of the signal 110' provided by the MEMS microphone unit 114, such as an amplified, quantized and/or filtered version of the signal 110' provided by the MEMS microphone unit 114.

Figure 2:
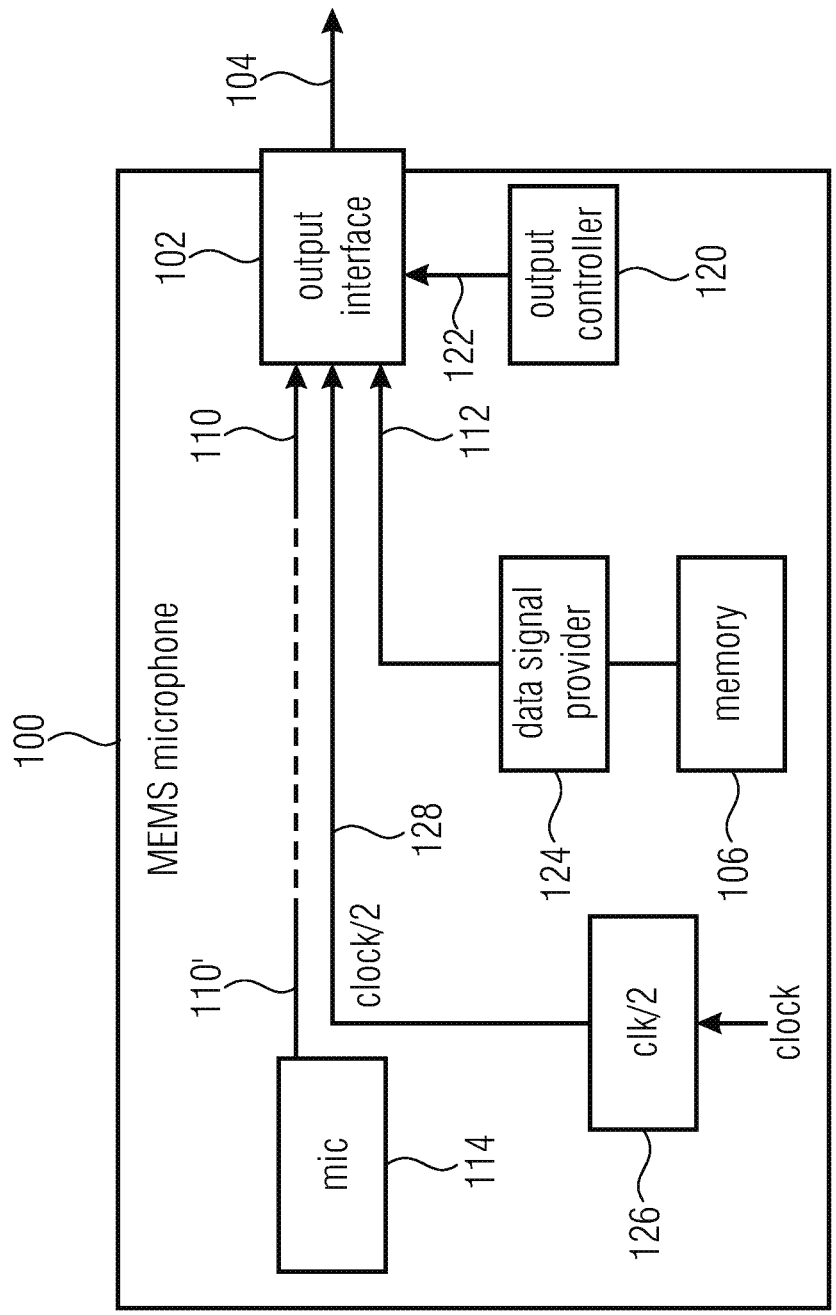
FIG. 2 shows a schematic block diagram of a MEMS microphone, according to an embodiment.

FIG. 2 shows a schematic block diagram of a MEMS microphone 100, according to an embodiment.

Compared to FIG. 1, the MEMS microphone 100 of FIG. 2 further comprises an output controller 120. The output controller 120 can be configured to control the output interface 102 to forward, in the initialization mode of operation, the data signal 112 as the output signal 104 of the MEMS microphone 100, and to control the output interface 102 to forward, in the normal mode of operation, the microphone signal 110 as the output signal of the MEMS microphone 100.

For example, the output controller 120 can be configured to provide a control signal 122 for controlling the output interface 102. In dependence on the control signal 122, the output interface 102 can either forward the microphone signal 110 or the data signal 112 as the output signal 104 of the MEMS microphone 100.

For example, the output interface 102 can be a multiplexer or switch configured to either forward the microphone signal 110 or the data signal 112 in dependence on the control signal 122.

For example, the output controller 120 can be implemented in software or hardware, such as in a microcontroller, microprocessor or FPGA (=field programmable gate array).

The MEMS microphone 100 can optionally comprise a data signal provider 124 configured to provide the data signal 112 carrying the information stored in the memory 106. For example, the data signal provider 124 can be a shift register configured to serially shift out data previously read out from the memory 106.

As already mentioned, the data signal 112 can be a binary signal.

Further, the MEMS microphone 100 can optionally comprise a clock divider 126 configured to provide a clock divided by two signal 128. This clock divided by two signal 128 is a PDM zero signal (without offset).

For example, the output controller 120 can be configured to control the output interface 102 to forward, in the initialization mode of operation, during one time interval of the initialization mode of operation the binary data signal 112 as the output signal 104 and during at least one other time interval of the initialization mode of operation the PDM zero signal 128 as the output signal 104. Thereby, the one-time interval of the initialization mode of operation during which the (binary) data signal 112 is provided as the output signal 104 is at least by a factor of two (or three, or four, or five, or ten) smaller than the at least one other time interval of the initialization mode of operation during which the PDM zero signal (without offset) is provided as the output signal 104.

For instance, during a first time interval of the initialization mode of operation the PDM zero signal 128 can be provided as the output signal, wherein during a second time interval of the initialization mode of operation, following the first time interval, the (binary) data signal 112 can be provided as the output signal 104, and wherein during a third time interval of the initialization mode of operation, following the second time interval, the PDM zero signal 128 can be provided as the output signal 104.

A signal processor (e.g., digital signal processor or codec) connected to the MEMS microphone 100 can receive, during the initialization mode of operation, this (binary) data signal 112 and set or adjust at least one signal processing parameter (e.g., a calibration parameter or a filter coefficient of a filter used for processing the microphone signal 110) in response to the information carried by the (binary) data signal 112. In contrast to that, a signal processor connected to the MEMS microphone 100 not being capable to receive the (binary) data signal 112 most likely would not notice the difference between the (binary) data signal 112 and the PDM zero signal 128 (without offset).

Subsequently, further embodiments of the MEMS microphone are described.

During startup (normally several ms) of the digital microphone 100, the acoustic signal is disconnected from the line. During this time the clock divided by two is applied to the data output (PDM zero without offset).

In embodiments, this time frame is used for transmitting data from the microphone 100 to the DSP or codec.

For example, after a synchronization preamble, the ID and or other configuration data (for example, a 16 bit preamble+ 48 bit data (this could be extended if necessary)) can be sent instead of the half clock. Codecs/DSPs can search for this leading preamble and extract the data from the bit stream.

Any device not able to read this additional information will not be affected since the time it takes to send the data is small (approx. 100 cycles) and the deviation from the offset-free zero PDM stream is small.

For instance, to simplify the logistic on system level for the customer the chip ID is beneficial to know. Another application is the read out of calibration parameters. For example, an acoustic roll off filter can be calibrated. Thereby, the coefficients of a digital filter, needed for the compensation, can be stored in the microphone 100. These data are needed in the DSP or codec to run the calibration filter.

In embodiments, data (chip ID and/or calibration parameters) is transmitted from the microphone 100 to the DSP or codec during a startup phase, when the acoustic signal is disconnected. Another opportunity to transmit data from the microphone 100 to the DSP or codec is when CMD (clock mode detection) detects a mode change. During clock mode change as well the acoustic signal is disconnected (same as during startup).

Embodiments provide the following advantages. First, embodiments enable the configurability of the host system for individual microphone. Second, embodiments provide a simple implementation, such as almost no area/power overhead in the microphone and/or a simple serial interface on host to capture chip ID/configuration data. Third, device with functionality can be used in a system that does not support it, as there is no significant effect on the data stream.

Figure 3:
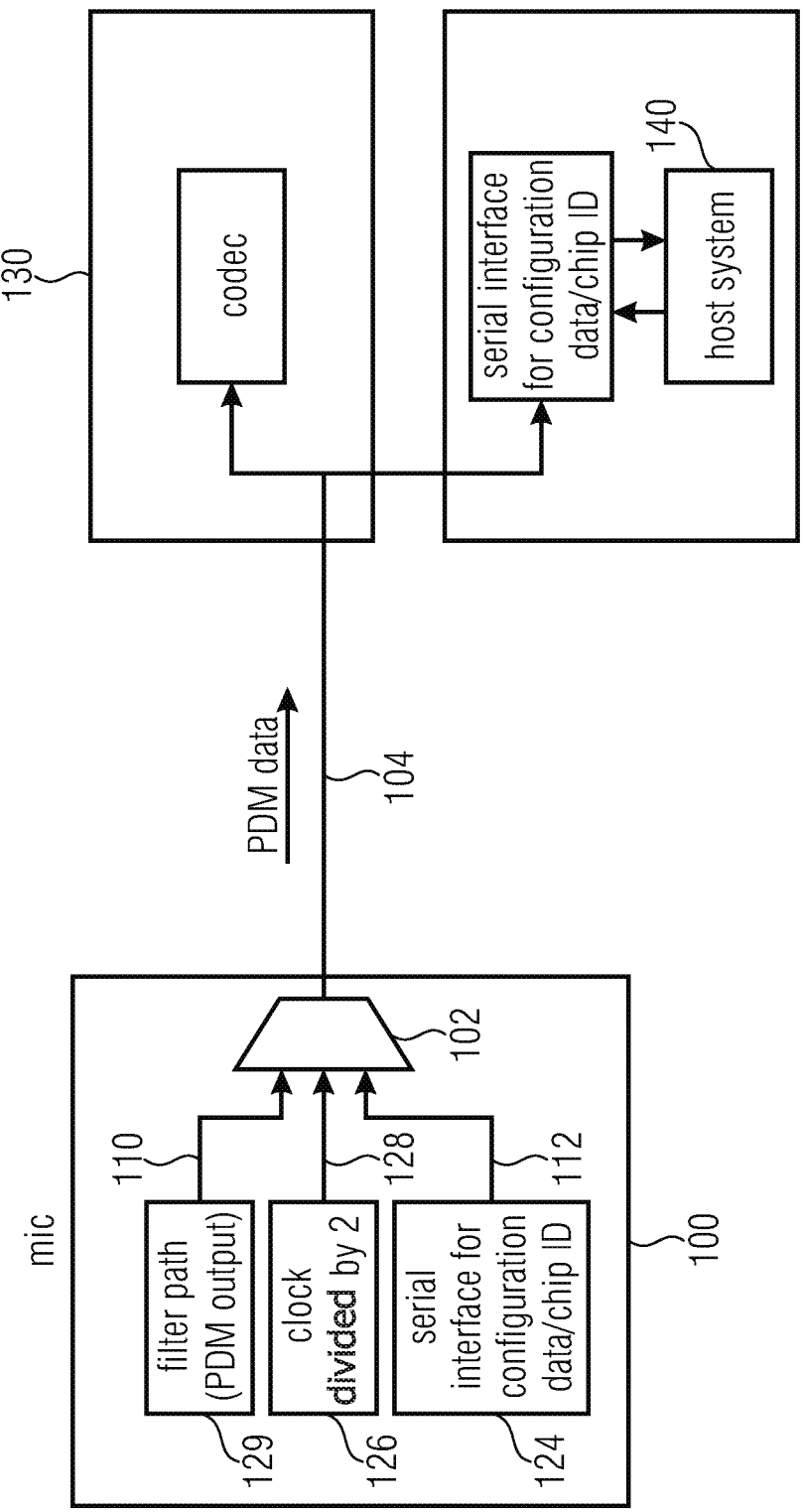
FIG. 3 shows a schematic block diagram of a system comprising a MEMS microphone and a signal processor, according to an embodiment.

FIG. 3 shows a schematic block diagram of a system comprising a MEMS microphone 100 and a signal processor 130 (e.g., codec), according to an embodiment.

As shown in FIG. 3, the MEMS microphone 100 comprises the output interface 102, which receives the microphone signal 110 from a filter path 129 of the MEMS microphone 100, the clock divided by two signal 128 from the clock divider 126, and the data signal 112 from the data signal provider 124 (e.g., serial interface for configuration data/chip ID).

The output interface 102 is configured to provide, in the initialization mode of operation, during different time intervals (e.g., subsequent time intervals) of the initialization mode of operation the clock divided by two signal 128 (e.g., PDM zero signal) and the data signal 112 (e.g., binary data signal) as output signal 104 to the signal processor 130 (e.g., codec).

Further, the output interface 102 is configured to provide, in the normal mode of operation, the microphone signal 110 as the output signal 104 to the signal processor 130 (e.g., codec).

In other words, on power up, the microphone 100 can read the configuration data from non-volatile memory (NVM) 106 where it was stored during calibration, and store this in a register, which can be serially shifted out during the start-up phase. It can also read the chip ID, which could be either stored in NVM or hard coded.

One scenario could be that after power on reset (PoR), the microphone is outputting a clock divided by two onto the PDM data port, so that the codec sees no DC level (mean value zero). After a period of time that includes the time to read the NVM, but before real data is valid from the microphone filter chain, the microphone will select to output the preamble—such as "all zeros" data (any sequence that is not a valid data output from the noise shaper can be used) instead of the clock divided by two signal. Immediately after the preamble it can serially shift out the data from the chip ID and/or configuration data.

The host system 140 needs a circuit that is reset by until the microphone is powered, and then searches the incoming data for the preamble. Once the preamble has been captured, it serial shifts in the data into a host accessible register/memory.

This chip ID/configuration data can be used by the host software to configure the codec filter for the relevant microphone.

Figure 4:
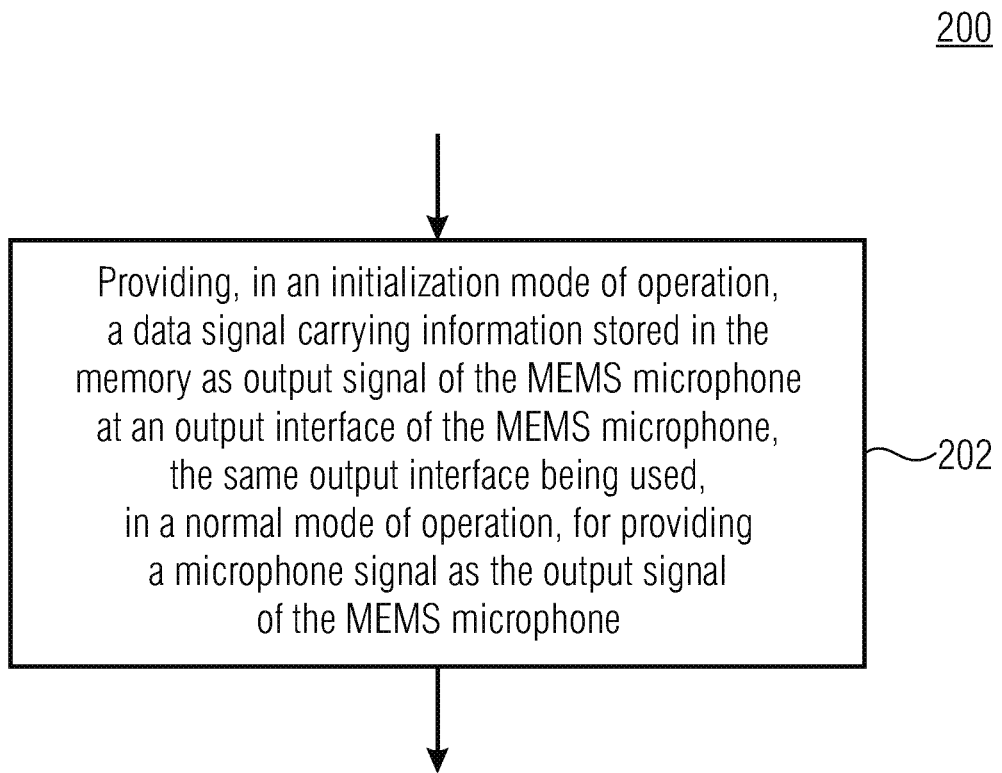
FIG. 4 shows a flowchart of a method for reading out data from a memory of a MEMS microphone, according to an embodiment.

FIG. 4 shows a flowchart of a method 200 for reading out data from a memory of a MEMS microphone, according to an embodiment. The method 200 comprises a step 202 of providing, in an initialization mode of operation, a data signal carrying information stored in the memory as output signal of the MEMS microphone at an output interface of the MEMS microphone, the same output interface being used, in a normal mode of operation, for providing a microphone signal as the output signal of the MEMS microphone.

Figure 5:
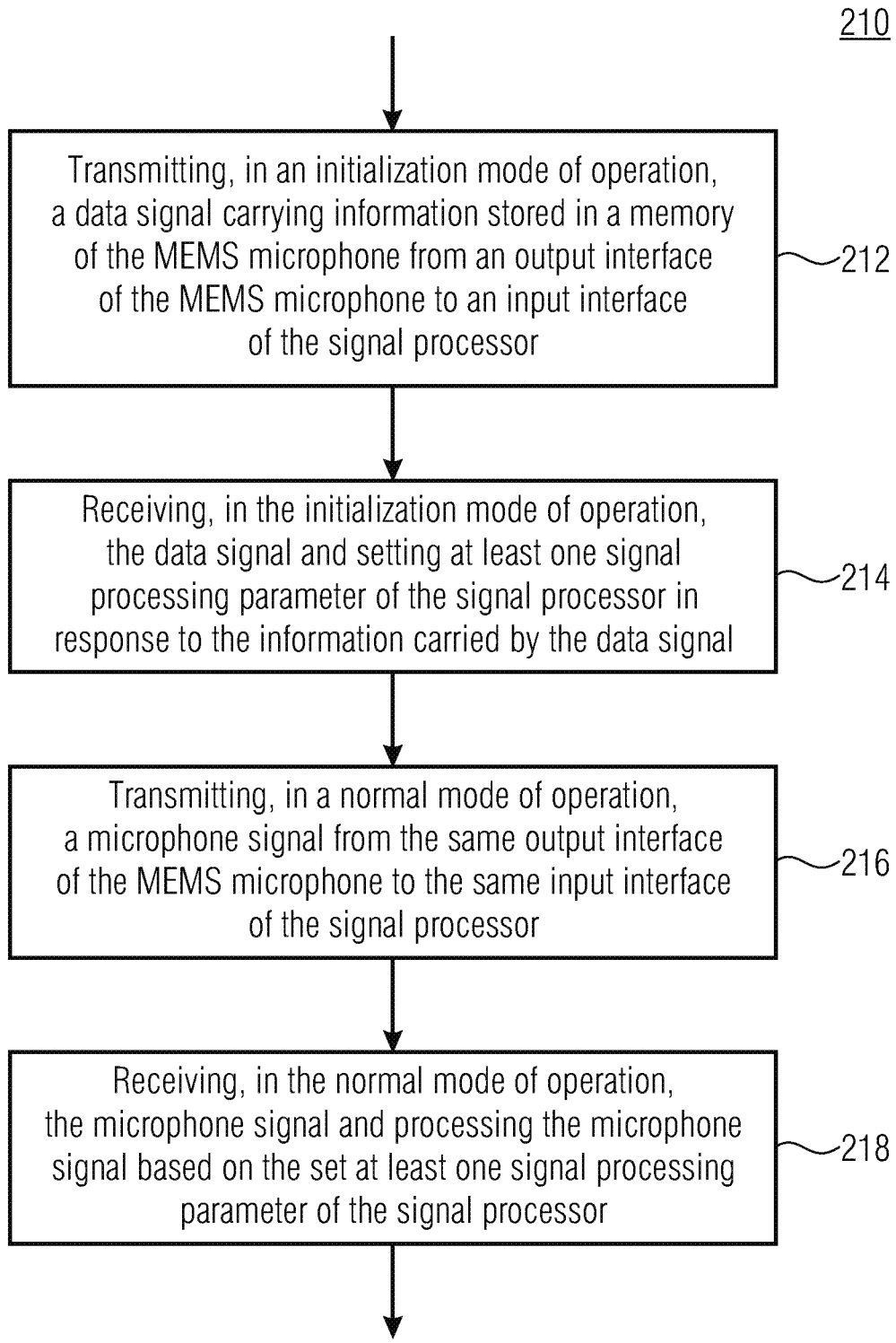
FIG. 5 shows a flowchart of a method for transmitting data from a MEMS microphone to a signal processor, according to an embodiment.

FIG. 5 shows a flowchart of a method 210 for transmitting data from a MEMS microphone to a signal processor (e.g., DSP or codec), according to an embodiment. The method 210 comprises a step 212 of transmitting, in an initialization mode of operation, a data signal carrying information stored in a memory of the MEMS microphone from an output interface of the MEMS microphone to an input interface of the signal processor. Further, the method 210 comprises a step 214 of receiving, in the initialization mode of operation, the data signal and setting at least one signal processing parameter of the signal processor (e.g., a filter coefficient of a filter used for processing a microphone signal of the MEMS microphone) in response to the information carried by the data signal. Further, the method 210 comprises a step 216 of transmitting, in a normal mode of operation, a microphone signal from the same output interface of the MEMS microphone to the same input interface of the signal processor. Further, the method 210 comprises a step 218 of receiving, in the normal mode of operation, the microphone signal and processing the microphone signal based on the set at least one signal processing parameter of the signal processor.

Subsequently, further embodiments are described.

Embodiment provide a MEMS microphone, comprising an output interface for providing an output signal of the MEMS microphone, and comprising a memory, wherein the output interface is configured to provide (or forward), in a normal mode of operation, a microphone signal as the output signal of the MEMS microphone, and wherein the output interface is configured to provide (or forward), in an initialization mode of operation, a data signal as the output signal of the MEMS microphone, wherein the data signal carries an information stored in the memory.

In embodiments, the output interface is a single line output interface.

In embodiments, the output interface is configured to provide, in the respective mode of operation, the microphone signal and the data signal at the same output pins (or terminals) of the output interface.

In embodiments, the initialization mode of operation is a power on reset mode.

In embodiments, the initialization mode of operation is a clock change mode.

In embodiments, the information stored in the memory comprises an ID (or identifier) of the MEMS microphone.

In embodiments, the information stored in the memory comprises at least one parameter (e.g., calibration parameter or filter coefficient) dependent on an acoustic characteristic of the MEMS microphone.

In embodiments, the data signal is a binary signal.

In embodiments, the data signal comprises a clock frequency equal to half of the clock frequency of a clock signal using which the MEMS microphone is clocked.

In embodiments, the output interface is configured to provide (or forward), in the initialization mode of operation, during one time interval of the initialization mode of operation the data signal as the output signal and during at least one other time interval of the initialization mode of operation a pulse density modulated zero signal as the output signal.

In embodiments, the one-time interval of the initialization mode of operation during which the data signal is provided as output signal is at least by a factor of two smaller than the at least one other time interval of the initialization mode of operation during which the pulse density modulated zero signal (without offset) is provided as output signal.

In embodiments, the MEMS microphone comprises an output controller, wherein the output controller is configured to control the output interface to forward, in the initialization mode of operation, the data signal as the output signal of the MEMS microphone, wherein the output controller is configured to control the output interface to forward, in the normal mode of operation, the microphone signal as the output signal of the MEMS microphone.

In embodiments, the output interface is a multiplexer or switch.

In embodiments, the MEMS microphone comprises a signal provider configured to provide the data signal.

In embodiments, the MEMS microphone comprises a MEMS microphone unit, wherein the microphone signal depends on a signal provided by the MEMS microphone unit.

In embodiments, the microphone signal is a processed version (e.g., amplified, quantized and/or filtered version) of the signal provided by the MEMS microphone.

In embodiments, the MEMS microphone is a digital MEMS microphone.

In embodiments, the output interface of the MEMS microphone is a single bit output interface, i.e. an output interface configured to provide a single bit per clock period.

Further embodiments provide a method for reading out data from a memory of a MEMS microphone. The method comprises a step of providing, in an initialization mode of operation, a data signal carrying information stored in the memory as output signal of the MEMS microphone at an output interface of the MEMS microphone, the same output interface being used, in a normal mode of operation, for providing a microphone signal as the output signal of the MEMS microphone.

Further embodiments provide a method for transmitting data from a MEMS microphone to a signal processor (e.g., DSP or codec). The method comprises a step of transmitting, in an initialization mode of operation, a data signal carrying information stored in a memory of the MEMS microphone from an output interface of the MEMS microphone to an input interface of the signal processor. Further, the method comprises a step of receiving, in the initialization mode of operation, the data signal and setting at least one signal processing parameter of the signal processor (e.g., a filter coefficient of a filter used for processing a microphone signal of the MEMS microphone) in response to the information carried by the data signal. Further, the method comprises a step of transmitting, in a normal mode of operation, a microphone signal from the same output interface of the MEMS microphone to the same input interface of the signal processor. Further, the method comprises a step of receiving, in the normal mode of operation, the microphone signal and processing the microphone signal based on the set at least one signal processing parameter of the signal processor.

In embodiment, the output interface of the MEMS microphone and the input interface of the signal processor are connected via a single line.

In embodiments, the signal processor is a digital signal processor or a codec.

Further embodiments provide an apparatus for reading out data from a memory of a MEMS microphone. The apparatus comprises means for providing, in an initialization mode of operation, a data signal carrying information stored in the memory as output signal of the MEMS microphone at an output interface of the MEMS microphone, the same output interface being used, in a normal mode of operation, for providing a microphone signal as the output signal of the MEMS microphone.

Further embodiments provide an apparatus for transmitting data from a MEMS microphone to a signal processor (e.g., DSP or codec). The apparatus comprises means for transmitting, in an initialization mode of operation, a data signal carrying information stored in a memory of the MEMS microphone from an output interface of the MEMS microphone to an input interface of the signal processor. Further, the apparatus comprises means for receiving, in the initialization mode of operation, the data signal and setting at least one signal processing parameter of the signal processor (e.g., a filter coefficient of a filter used for processing a microphone signal of the MEMS microphone) in response to the information carried by the data signal. Further, the apparatus comprises means for transmitting, in a normal mode of operation, a microphone signal from the same output interface of the MEMS microphone to the same input interface of the signal processor. Further, the apparatus comprises means for receiving, in the normal mode of operation, the microphone signal and processing the microphone signal based on the set at least one signal processing parameter of the signal processor.

Embodiments keep the two pin interface (clock+data) thereby allowing to use the same pinout/package than the current PDM interface devices.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A MEMS microphone, comprising:
   an output interface for providing an output signal of the MEMS microphone; and
   a memory,
   wherein the output interface is configured to provide, in a normal mode of operation, a microphone signal as the output signal of the MEMS microphone, and
   wherein the output interface is configured to provide, in an initialization mode of operation triggered by a power on reset of the MEMS microphone, a data signal as the output signal of the MEMS microphone, wherein the data signal carries information stored in the memory, wherein the data signal comprises a plurality of bits, and wherein the data signal is triggered by the power on reset.

2. The MEMS microphone of claim 1, wherein the output interface is a single line output interface.

3. The MEMS microphone according to claim 1, wherein the output interface is configured to provide, in the respective normal mode of operation and the initialization mode of operation, the microphone signal and the data signal at same output pins of the output interface.

4. The MEMS microphone according to claim 1,
   wherein the information stored in the memory comprises an ID of the MEMS microphone, or
   wherein the information stored in the memory comprises at least one parameter dependent on an acoustic characteristic of the MEMS microphone.

5. The MEMS microphone according claim 1, wherein the data signal is a binary signal.

6. The MEMS microphone according to claim 5, wherein the data signal comprises a clock frequency equal to half of the clock frequency of a clock signal by which the MEMS microphone is clocked.

7. The MEMS microphone according to claim 5, wherein the output interface is configured to provide, in the initialization mode of operation, during one time interval of the initialization mode of operation the data signal as the output signal and during at least one other time interval of the initialization mode of operation a pulse density modulated zero signal as the output signal.

8. The MEMS microphone according to claim 1,
   wherein the MEMS microphone comprises an output controller,
   wherein the output controller is configured to control the output interface to forward, in the initialization mode of operation, the data signal as the output signal of the MEMS microphone, and
   wherein the output controller is configured to control the output interface to forward, in the normal mode of operation, the microphone signal as the output signal of the MEMS microphone.

9. The MEMS microphone according to claim 1, wherein the output interface is a multiplexer or switch.

10. The MEMS microphone according to claim 1, wherein the MEMS microphone comprises a signal generator configured to generate the data signal.

11. The MEMS microphone according to claim 1,
    wherein the MEMS microphone comprises a MEMS microphone unit, and
    wherein the microphone signal depends on a signal provided by the MEMS microphone unit.

12. A method for reading out data from a memory of a MEMS microphone, the method comprising:
    operating the MEMS microphone in an initialization mode of operation in response to a power on reset; and
    providing, in the initialization mode of operation, a data signal carrying information stored in the memory as output signal of the MEMS microphone at an output interface of the MEMS microphone, the same output interface being used, in a normal mode of operation, for providing a microphone signal as the output signal of the MEMS microphone, wherein the data signal comprises a plurality of bits, and wherein the data signal is triggered by the power on reset.

13. The method of claim 12, further comprising:
clocking the data signal at a first clock frequency during the initialization mode of operation; and
clocking the microphone signal at a second frequency different from the first clock frequency during the normal mode of operation.

14. A non-transitory machine readable medium having stored thereon a program having a program code for performing the method of claim 12, when the program is executed on a processor.

15. A method for transmitting data from a MEMS microphone to a signal processor, the method comprising:
operating the MEMS microphone in an initialization mode of operation in response to a power on reset;
transmitting, in the initialization mode of operation, a data signal carrying information stored in a memory of the MEMS microphone from an output interface of the MEMS microphone to an input interface of the signal processor, wherein the data signal comprises a plurality of bits, and wherein the data signal is triggered by the power on reset;
receiving, in the initialization mode of operation, the data signal and setting at least one signal processing parameter of the signal processor in response to the information carried by the data signal;
transmitting, in a normal mode of operation, a microphone signal from the same output interface of the MEMS microphone to the same input interface of the signal processor; and
receiving, in the normal mode of operation, the microphone signal and processing the microphone signal based on the setting the at least one signal processing parameter of the signal processor.

16. The method of claim 15, further comprising:
clocking the data signal at a first clock frequency during the initialization mode of operation; and
clocking the microphone signal at a second frequency different from the first clock frequency during the normal mode of operation.

17. The method of claim 15, wherein:
the at least one signal processing parameter comprises a coefficient of a filter used for processing the microphone signal; and
processing the microphone signal comprises filtering the microphone signal using the coefficient of the filter.

18. The method of claim 15, wherein the data signal comprises a synchronization preamble, and the method further comprises monitoring the data signal for the synchronization preamble during the initialization mode of operation.

* * * * *